(12) United States Patent
Shreve

(10) Patent No.: US 10,717,024 B2
(45) Date of Patent: Jul. 21, 2020

(54) GAS LIQUID SEPARATOR AND ASSOCIATED SYSTEMS AND METHODS

(71) Applicant: Joshua A. Shreve, Franklin, MA (US)

(72) Inventor: Joshua A. Shreve, Franklin, MA (US)

(73) Assignee: Waters Technologies Corporation, Milford, MA (US)

(*) Notice: Subject to any disclaimer, the term of this patent is extended or adjusted under 35 U.S.C. 154(b) by 136 days.

(21) Appl. No.: 15/792,464

(22) Filed: Oct. 24, 2017

(65) Prior Publication Data

US 2018/0111061 A1 Apr. 26, 2018

Related U.S. Application Data

(60) Provisional application No. 62/412,454, filed on Oct. 25, 2016.

(51) Int. Cl.
*B01D 51/08* (2006.01)
*B01D 15/40* (2006.01)
(Continued)

(52) U.S. Cl.
CPC ............ *B01D 15/40* (2013.01); *B01D 15/10* (2013.01); *B01D 15/161* (2013.01); *B01D 15/163* (2013.01); *B01D 19/0005* (2013.01); *B01D 19/0042* (2013.01); *B01D 19/0057* (2013.01); *B01D 19/0063* (2013.01);
(Continued)

(58) Field of Classification Search
CPC .. B01D 15/40; B01D 19/0063; B01D 15/163; B01D 19/0042; B01D 15/161; B01D 19/0057; B01D 19/0005; B01D 15/10; B01D 19/0021; B01D 2257/504; G01N 30/84
See application file for complete search history.

(56) References Cited

U.S. PATENT DOCUMENTS 445,472 A * 1/1891 Manning ............ B01D 46/0031
96/409
1,779,023 A * 10/1930 Waters .................. B01D 19/00
55/446
(Continued)

FOREIGN PATENT DOCUMENTS

GB 2099718 A 12/1982
WO 2013134473 A1 9/2013

OTHER PUBLICATIONS

Berger, C. et al. "Preparative supercritical fluid chromatography", Journal of Chromatography A, Elsevier, Amsterdam, NL, vol. 505, No. 1, Apr. 25, 1990 (Apr. 25, 1990), pp. 37-43.
(Continued)

*Primary Examiner* — Dung H Bui
(74) *Attorney, Agent, or Firm* — Womble Bond Dickinson; Deborah M. Vernon; Heath T. Misley

(57) ABSTRACT

Exemplary embodiments are directed to a gas liquid separator that includes a chamber, a fluid mixture inlet, a solvent outlet and a gas outlet. The gas liquid separator can include a phase-change inducing mechanism disposed in or proximate to the fluid mixture inlet. Exemplary methods of improving separation of a fluid mixture in a gas liquid separator and $CO_2$-based chromatography flow systems including a gas liquid separator are also provided.

11 Claims, 4 Drawing Sheets

(51) Int. Cl.
  *B01D 19/00* (2006.01)
  *B01D 15/16* (2006.01)
  *B01D 15/10* (2006.01)
  *G01N 30/84* (2006.01)

(52) U.S. Cl.
  CPC .... *B01D 19/0021* (2013.01); *B01D 2257/504* (2013.01); *G01N 30/84* (2013.01)

(56) References Cited

U.S. PATENT DOCUMENTS

| | | | | |
|---|---|---|---|---|
| 2,547,769 A * | 4/1951 | Packie | .................. | B01D 45/02 55/337 |
| 2,786,546 A * | 3/1957 | McMillin | ........... | B01D 19/0057 96/209 |
| 3,630,002 A * | 12/1971 | Burrus | ............... | B01D 19/0063 96/164 |
| 3,731,467 A * | 5/1973 | Jennings | ................ | B01D 45/12 55/459.4 |
| 4,217,118 A * | 8/1980 | Kopf | .................. | B01D 46/2411 55/330 |
| 4,539,023 A * | 9/1985 | Boley | ................... | B01D 1/305 96/184 |
| 4,724,087 A | 2/1988 | Perrut | | |
| 5,049,171 A * | 9/1991 | Presnell | ................. | B01D 45/16 55/338 |
| 5,312,552 A * | 5/1994 | Norman | ................. | B01D 17/00 210/104 |
| 5,427,685 A * | 6/1995 | Thorley | ............ | B01D 19/0057 210/512.1 |
| 7,785,400 B1 * | 8/2010 | Worley | ............. | B01D 19/0042 55/423 |
| 2010/0200242 A1 * | 8/2010 | Rodger | ................... | E21B 43/34 166/369 |
| 2014/0216303 A1 * | 8/2014 | Lee | ......... | C04B 22/10 106/638 |
| 2015/0251905 A1 * | 9/2015 | Elkind | ................... | C01B 3/042 423/579 |
| 2016/0008742 A1 * | 1/2016 | Adler | ................ | B01D 19/0063 96/157 |

OTHER PUBLICATIONS

International Search Report and Written Opinion issued for International Patent Application No. PCT/IB2017/056601 dated Jan. 17, 2018 and dated Jan. 25, 2018.

* cited by examiner

GAS LIQUID SEPARATOR AND ASSOCIATED SYSTEMS AND METHODS

RELATED APPLICATIONS

This application claims priority to U.S. Provisional Patent Application Ser. No. 62/412,454 entitled "Gas Liquid Separator and Associated Systems and Methods," filed on Oct. 25, 2016, the content of which is hereby incorporated by reference in its entirety.

TECHNICAL FIELD

The present disclosure relates to gas liquid separators (GLS) and associated systems and methods and, in particular, to gas liquid separators that create a phase change of a substantial part of a fluid mixture at or within a fluid mixture inlet to the GLS.

BACKGROUND

Chromatographic techniques are important tools for the identification and separation of complex samples. The basic principle underlying chromatographic techniques is the separation of a mixture into individual components by transporting the mixture in a moving fluid through a retentive media. The moving fluid is typically referred to as the mobile phase and the retentive media is typically referred to as the stationary phase. The separation of the various constituents of the mixture is based on differential partitioning between the mobile and stationary phases. Differences in components' partition coefficient result in differential retention on the stationary phase, resulting in separation.

Conventionally, the methods of choice for chromatographic separations have been gas chromatography (GC) and liquid chromatography (LC). One major difference between GC and LC is that the mobile phase in GC is a gas, whereas the mobile phase in LC is a liquid. For example, in GC, a supply of inert carrier gas (mobile phase) is continually passed as a stream through a heated column containing porous sorptive media (stationary phase). A sample of the subject mixture is injected into the mobile phase stream and passed through the column, where separation of the mixture is primarily due to the differences in the volatile characteristics of each sample component at the temperature of the column. A detector, positioned at the outlet end of the column, detects each of the separated components as they exit the column. Although GC is typically a sensitive method of analysis, the high temperatures required in GC make this method unsuitable for high molecular weight biopolymers or proteins (e.g., heat can denature them), frequently encountered in biochemistry.

Conversely, LC is a separation technique in which the mobile phase is a liquid and does not require volatilization of the sample. Liquid chromatography that generally utilizes small packing particles and moderately high pressure is referred to as high-performance liquid chromatography (HPLC); whereas liquid chromatography that generally utilizes very small packing particles and high pressure is referred to as ultra-high performance liquid or ultra-high pressure liquid chromatography (UHPLC). In HPLC and UHPLC the sample is forced by a liquid at high pressure (the mobile phase) through a column that is packed with a stationary phase composed of, for example, irregularly or spherically shaped particles, a porous monolithic layer, or a porous membrane, etc.

Because LC uses liquid as the mobile phase, LC techniques are capable of analyzing higher molecular weight compounds. For example, LC can be used to prepare large scale batches of purified protein(s). In contrast, GC techniques are typically more sensitive. For example, GC can be used for the separation of single chiral materials, such as to isolate and determine the relative purity of a chiral compound by determining the enantiomeric excess (% ee) or the diastereomeric excess (% de) of a particular chiral compound. As with most chromatographic techniques, the limiting factor in both GC and LC has been the ability to obtain and/or reproduce pure sample separations, each of which are typically dependent on the apparatus, methods, and conditions employed, e.g., flow rate, column size, column packing material, solvent gradient, and the like.

Supercritical Fluid Chromatography (SFC) is another chromatographic technique which involves a supercritical or near supercritical fluid as the mobile phase. For every liquid substance there is a temperature above which it can no longer exist as a liquid, no matter how much pressure is applied. Likewise, there is a pressure above which the substance can no longer exist as a gas no matter how much the temperature is raised. These points are called the supercritical temperature and supercritical pressure, and define the boundaries on a phase diagram for a pure substance (FIG. 1). At this point, the liquid and vapor have the same density and the fluid cannot be liquefied by increasing the pressure. Above this point, where no phase change occurs, the substance acts as a supercritical fluid (SF). Thus, SF can be described as a fluid obtained by heating above the critical temperature and compressing above the critical pressure. There is a continuous transition from liquid to SF by increasing temperature at constant pressure or from gas to SF by increasing pressure at constant temperature.

The term SFC, while typically standing for Supercritical Fluid Chromatography, does not require or mean that supercritical conditions are obtained during or maintained throughout the separation. That is, columns do not have to be always operated in the critical region of the mobile phase. For example, in the event that the mobile phase includes a modifier (e.g., $CO_2$ and methanol as a modifier), the mobile phase is often in its subcritical region (e.g., a highly compressed gas or a compressible liquid rather than a supercritical fluid). In fact, as Guiochon et al. note in section 2.3 of their review article entitled "Fundamental challenges and opportunities for preparative supercritical fluid chromatography" Journal of Chromatography A, 1218 (2011) 1037-1114: "It is obvious that SFC has very often been and still is run under subcritical conditions." Thus, the term SFC is not limited to processes requiring supercritical conditions.

In certain embodiments, SFC systems use $CO_2$, thereby permitting SFC processes to be inexpensive, innocuous, eco-friendly, and non-toxic. There is typically no need for the use of volatile solvent(s) (e.g., hexane). Finally, the mobile phase in SFC processes (e.g., $CO_2$ together with any modifier/additive as a SF, highly compressed gas, or compressible liquid) typically have higher diffusion constants and lower viscosities relative to liquid solvents. The low viscosity means that pressure drops across the column for a given flow rate is greatly reduced. The increased diffusivity means longer column length can be used.

Chromatographic processes using a mobile phase consisting at least in part of $CO_2$ is sometimes referred to as $CO_2$-based chromatography. $CO_2$-based chromatography can utilize supercritical or near supercritical $CO_2$ for a mobile phase. $CO_2$-based chromatography does not require the use of SFs. In general, $CO_2$ when used as a constituent of a mobile phase in chromatography is considered to be a compressible fluid, providing a higher diffusion constant and lower viscosity compared to liquid solvents used in LC, HPLC, and UHPLC processes.

Some $CO_2$-based chromatography systems use a gas liquid separator (GLS) to separate the fluid mixture (e.g., a mobile phase combined with a sample) into a solvent and gas after passing through the column for disposal purposes. Current chromatography systems do not have direct regulation of the flow energy entering the GLS. Thus, if pressure of the fluid mixture is reduced prior to reaching the GLS, an aerosol or multiphase flow through tubing can leave behind a portion of the sample (unless additional solvent is added), can disperse the sample, or both. In addition, if the pressure is reduced before the GLS and the flow of the fluid mixture is too low, there may not be adequate energy in the flow to create sufficient separation of the solvent and gas (e.g., no impingement in an impinging GLS, no vorticity in a cyclone GLS, and the like).

In addition, with reference to FIG. 2, certain chromatography systems 10 include a gas liquid separator 12 and a back pressure regulator 14 disposed upstream of the gas liquid separator 12. Some chromatography systems 10 include a first heater 16 disposed upstream of the back pressure regulator 14 which provides energy to the flow of the fluid mixture prior to entering the back pressure regulator 14. However, due to an energy drop in the flow of the fluid mixture while passing through the back pressure regulator 14, a second heater 18 is generally used to provide energy to the flow of the fluid mixture prior to entering the gas liquid separator 12. The fluid mixture is generally transformed to gas at the back pressure regulator 14 and the pressure difference in the gas liquid separator 12 is decided by the flow of the fluid mixture and system restrictions, e.g., pipe sizes. The energy of the fluid mixture entering the phase change can also vary significantly with, e.g., flow rate, composition, and the like. However, downstream of the back pressure regulator 14, there is no direct regulation of the flow energy of the fluid mixture entering the gas liquid separator 12 to ensure full separation.

In some instances, some or all of the sample can be lost or dispersed in the piping, the components, or both, between the first heater 16 and the gas liquid separator 12. In addition, the manufacturing costs associated with the chromatography system 10 can increase due to the additional piping and components necessary for connecting the gas liquid separator 12, the first and second heaters 14, 18, and the back pressure regulator 16.

SUMMARY

Exemplary embodiments of the present technology include gas liquid separators and associated systems and methods which create a phase change of a substantial part of a fluid mixture at or within a fluid mixture inlet to ensure all or part of a sample is not left behind in upstream piping and that the fluid mixture has sufficient energy for separation of the solvent and the gas. Exemplary embodiments of the present technology also include gas liquid separators and associated systems and methods which allow a reduction in the amount of piping and components in a flow system while maintaining the energy of the flow of the fluid mixture into the gas liquid separator.

In general, embodiments of the present disclosure are directed to gas liquid separators that include a phase-change inducing mechanism disposed in or proximate to the fluid mixture inlet to create the phase change of a substantial part of the fluid mixture such that kinetic energy or velocity of the fluid mixture is increased.

In accordance with embodiments of the present disclosure, exemplary gas liquid separators are provided that include a chamber, a fluid mixture inlet, a liquid solvent outlet and a gas outlet. The chamber can receive a fluid mixture, e.g., a mixture of $CO_2$ and a solvent. The fluid mixture can be introduced into the chamber for separation into a gas and solvent. The fluid mixture inlet provides an inlet for the fluid mixture into the chamber. The solvent outlet can discharge the solvent from the chamber after separation of the solvent from the gas. The gas outlet can discharge the gas from the chamber after separation of the gas from the solvent.

In some embodiments, the gas liquid separator can include a mechanism, e.g., a phase-change inducing mechanism, a regulator, and the like, disposed in or proximate to the fluid mixture inlet to create a phase change of a substantial part of the fluid mixture at or within the fluid mixture inlet. For example, the phase-change inducing mechanism can create a phase change of the $CO_2$ of the fluid mixture to a supercritical phase to increase the kinetic energy of the fluid mixture for separation. In some embodiments, the phase change of the substantial part of the fluid mixture can occur at, within, or proximate to a nozzle of the fluid mixture inlet. Creating the phase change of the substantial part of the fluid mixture can include expansion of the fluid mixture from liquid to gas. Creating the phase change of the substantial part of the fluid mixture at, within or proximate to the fluid mixture inlet can provide energy to the fluid mixture prior to introduction of the fluid mixture into the chamber to improve separation of the fluid mixture into the solvent and the gas.

In some embodiments, providing energy to the fluid mixture can increase the kinetic energy or velocity of the fluid mixture to provide an increased impact force of the fluid mixture against an impinging separator element within the chamber. In some embodiments, providing energy to the fluid mixture can increase the kinetic energy or velocity of the fluid mixture to provide an increased centrifugal vortex of the fluid mixture within a cyclone separator element within the chamber.

The phase-change inducing mechanism can maintain the fluid mixture in a liquid state, or substantially a liquid state, prior to the phase change at or within the fluid mixture inlet. In some embodiments, the phase-change inducing mechanism can be at least one of an actively controlled pressure regulator or a passively controlled pressure regulator. The actively controlled pressure regulator can include a sensor. The sensor can provide feedback to the actively controlled pressure regulator and can be disposed upstream of the actively controlled pressure regulator. In some embodiments, the passively controlled pressure regulator can include a spring load.

In some embodiments, the phase-change inducing mechanism can be a one stage regulator or a two stage regulator. The one stage regulator can be set for a predetermined pressure of the fluid mixture at the fluid mixture inlet. In one embodiment, the predetermined pressure is any pressure above the phase equilibrium pressure for the allowable operating temperatures. For example, in one embodiment in which carbon dioxide is used at a maximum operating temperature of 30 C, the predetermined pressure can be set at 1100 psi (i.e., above 1000 psi for min flow and below 1300 for maximum flow). In general, the pressure will fluctuate with flow rate. As a result, flow rate changes should be taken into account to set the predetermined pressure. The two stage regulator can include a first stage for regulating a pressure of the fluid mixture at or within the fluid mixture inlet and a second stage for regulating or controlling the phase change of the substantial part of the fluid mixture. In some embodiments, the one stage regulator can include a single control valve for performing a fine control and a phase change in one regulator. Due to the complex nature of regulating the nonlinear effects of phase change, in some embodiments, the two stage regulator can include two control valves, e.g., a coarse control valve and a fine control valve. For example, the coarse control valve can handle the pressure drop associated with the phase change and the fine control valve can function with a more linear and stable system. In some embodiments, the phase-change inducing mechanism can include, e.g., a needle, a poppet, a seat, a diaphragm, combinations thereof, and the like. In one embodiment, the course control valve does not respond to transient disturbances, but rather holds steady pressure, that is this valve hold pressures at ±30 psi, or even ±50 psi. In some embodiments the fine control valve can hold pressures better than about ±10 psi.

In accordance with embodiments of the present disclosure, exemplary methods of improving separation of a fluid mixture in a gas liquid separator are provided that include providing the gas liquid separator. The gas liquid separator includes a chamber, a fluid mixture inlet, a solvent outlet and a gas outlet. The chamber can receive the fluid mixture. The fluid mixture can be introduced into the chamber for separation into a gas and solvent. The fluid mixture inlet provides an inlet for the fluid mixture into the chamber. The solvent outlet can discharge the solvent from the chamber after separation of the solvent from the gas. The gas outlet can discharge the gas from the chamber after separation of the gas from the solvent. The gas liquid separator can include a mechanism, e.g., a phase-change inducing mechanism, disposed in or proximate to the fluid mixture inlet for creating a phase change of a substantial part of the fluid mixture at or within the fluid mixture inlet.

The methods can include introducing the fluid mixture into the fluid mixture inlet. The methods can include creating a phase change of a substantial part of the fluid mixture with the phase-change inducing mechanism at or within the fluid mixture inlet. Creating the phase change of the substantial part of the fluid mixture with the phase-change inducing mechanism at, within or proximate to the fluid mixture inlet can include providing energy to the fluid mixture to increase the kinetic energy or velocity of the fluid mixture prior to introduction of the fluid mixture into the chamber to improve separation of the fluid mixture into the solvent and the gas.

In accordance with embodiments of the present disclosure, exemplary flow systems including a gas liquid separator are provided that include a source of a fluid mixture and a gas liquid separator. The gas liquid separator can be disposed downstream of the source of the fluid mixture and can be fluidly connected to the source of the fluid mixture. The gas liquid separator can include a chamber, a fluid mixture inlet, a solvent outlet and a gas outlet. The chamber can receive the fluid mixture. The fluid mixture can be introduced into the chamber for separation into a gas and solvent. The fluid mixture inlet provides an inlet for the fluid mixture into the chamber. The solvent outlet can discharge the solvent from the chamber after separation of the solvent from the gas. The gas outlet can discharge the gas from the chamber after separation of the gas from the solvent.

The gas liquid separator can include a mechanism, e.g., a phase-change inducing mechanism, disposed in or proximate to the fluid mixture inlet to create a phase change of a substantial part of the fluid mixture at or within the fluid mixture inlet. In some embodiments, the flow systems can include a heating element disposed upstream of the phase-change inducing mechanism to provide energy to the fluid mixture prior to introducing the fluid mixture into the chamber. In some embodiments, the flow system can be, e.g., a $CO_2$-based chromatography system, a supercritical fluid chromatography system, or the like.

The above exemplary embodiments in accordance with the present disclosure provide many advantages. For example, one or more embodiments described herein increase the energy of the fluid mixture prior to discharge into the chamber of the gas liquid separator at or within the fluid mixture inlet. As a result, the sample, or substantially all of the sample, is not left behind in upstream piping of the flow system. In addition, by increasing the energy of the fluid mixture at, within or proximate to the fluid mixture inlet prior to discharge into the chamber of the gas liquid separator, sufficient energy is provided to the flow of the fluid mixture for the desired separation of the fluid mixture into the solvent and the gas to occur within the gas liquid separator. In some embodiments, the separation of the fluid mixture can be a full separation, e.g., substantially 100%. In certain embodiments the amount of separation is 97%, 95%, 93%, or 90%. In some embodiments, the separation of the fluid mixture can be a partial separation, e.g., 85% gas and 15% solvent. Further still, by increasing the energy of the fluid mixture at or within the fluid mixture inlet, the amount of piping, components, or both, in a flow system can be reduced while maintaining sufficient flow of the fluid mixture for separation. In one embodiment, a measurement of separation is performed by comparing the percent of solvent that comes out of the solvent line versus the input.

Other advantages and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed gas liquid separators and associated systems and methods, reference is made to the accompanying figures (which are not necessarily to scale), wherein.

DESCRIPTION OF EXEMPLARY EMBODIMENTS

Figure 1:
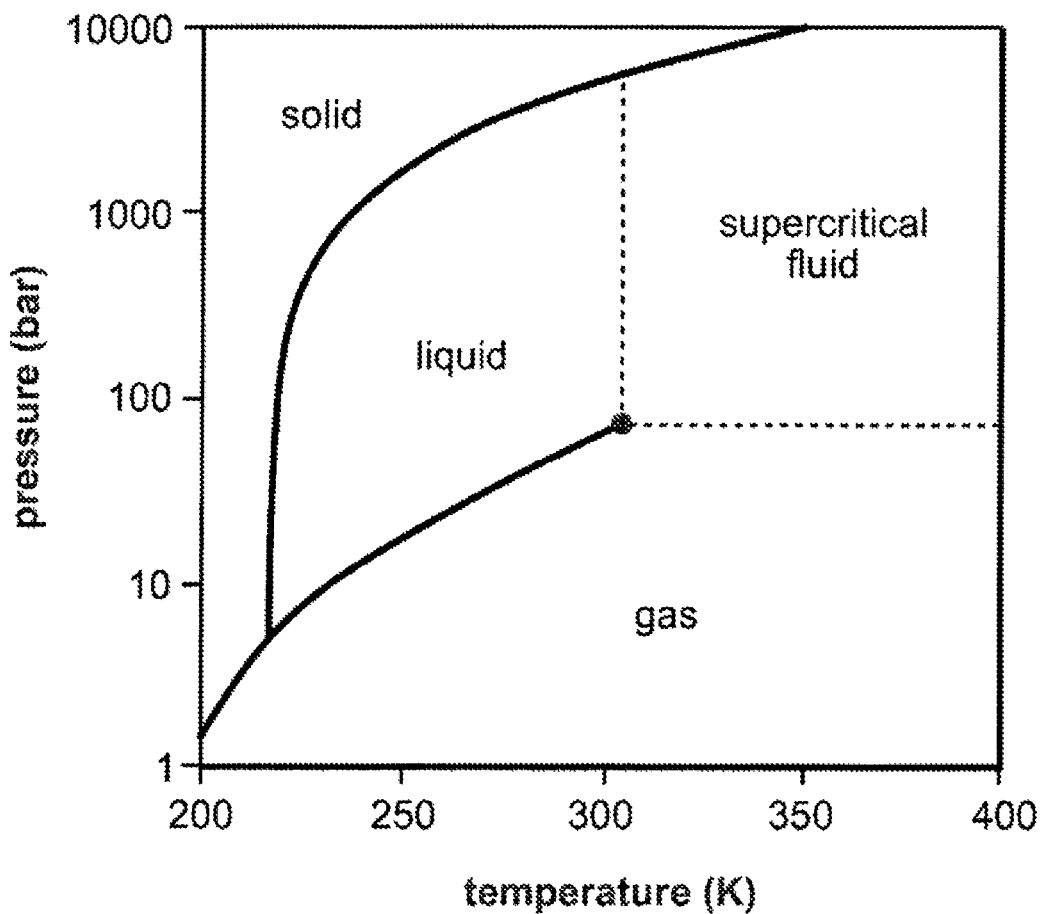
FIG. 1 is an exemplary graph of the physical state of a substance in relation to a temperature and pressure associated with the substance.

SFC or $CO_2$-based chromatography systems can be adapted as a hybrid between HPLC and GC apparatuses, where the predominant modification is replacement of either the liquid or gas mobile phase with a supercritical fluid (or near supercritical fluid) mobile phase, such as with $CO_2$. In SFC or in some $CO_2$-based chromatography systems (which utilize SFs), the mobile phase is initially pumped as a liquid and is brought into the supercritical region by heating or pressurizing the mobile phase above its supercritical temperature/pressure prior to entry into a column. As the mobile phase passes through an injection valve, the sample is introduced into the supercritical stream, and the mixture is then transferred into a column. The mixture passes through the column (at supercritical or liquid state) and into the detector.

In general, the mobile phase in SFC or $CO_2$-based chromatography system processes has the ability to act both as a substance carrier (like the mobile phases in GC) and dissolve substances readily (like the solvents used in LC). In addition to generally having lower viscosities and better diffusion profiles similar to those of certain gases, the mobile phase in SFC or $CO_2$-based chromatography system processes also generally has high densities and dissolving capacities similar to those of certain liquids. For example, SFs' high densities (0.2-0.5 $gm/cm^3$) provide for their remarkable ability to dissolve large, non-volatile molecules, e.g., supercritical or near supercritical $CO_2$ readily dissolves n-alkanes, di-n-alkyl phthalates, and polycyclic and aromatic compounds. $CO_2$ under pressures and temperatures used in chromatographic processes also possess similarly high densities and dissolving capacities. Since the diffusion of solutes in a SFC or $CO_2$-based chromatography system mobile phase is about ten times greater than that in liquids (about three times less than in gases), this results in a decrease in resistance to mass transfer in the column and allows for fast high resolution separation. Also, the solvation strength of the mobile phase in SFC or $CO_2$-based chromatography system processes is directly related to the fluid density. Thus, the solubility of solids can be easily manipulated by making slight changes in temperatures and pressures.

Another important property of the mobile phase in SFC or $CO_2$-based chromatography system processes is that it provides high resolution chromatography at much lower temperatures. For example, an analyte dissolved in $CO_2$ can be recovered by reducing the pressure and allowing the sample to evaporate under ambient laboratory conditions. This property is useful when dealing with thermally unstable analytes, such as high molecular weight biopolymers or proteins.

The combination of one or more mechanical or column changes to an SFC instrument and/or a $CO_2$-based chromatography instrument coupled with the inherent properties of chromatography itself, allows for the separation of both chiral and achiral compounds, and has become increasingly predominant in the field of preparatory separations for drug discovery and development. As is known in the art, a $CO_2$-based chromatography system, an SFC system or a UHPLC system can be pressurized with, e.g., $CO_2$, a solvent, a combination of both, or the like, and can utilize a modifier, e.g., methanol, ethanol, and the like. In addition to including $CO_2$ and optional solvents and/or modifiers, the mobile phase also contains the sample of interest just prior to entering the column. The combination of the mobile phase and the sample of interest creates a fluid mixture.

In general, embodiments of the present disclosure are directed to gas liquid separators that can include a phase-change inducing mechanism disposed in or proximate to the fluid mixture inlet to create the phase change of a substantial part of the fluid mixture such that the kinetic energy or velocity of the fluid mixture is increased.

In accordance with embodiments of the present disclosure, exemplary gas liquid separators (GLS) are provided that include a chamber, a fluid mixture inlet, a solvent outlet and a gas outlet. The chamber receives a fluid mixture, e.g., a mixture of $CO_2$ and a solvent. The fluid mixture can be introduced into the chamber for separation into a gas and solvent. The fluid mixture inlet provides an inlet for the fluid mixture into the chamber. The solvent outlet can discharge the solvent from the chamber after separation of the solvent from the gas. The gas outlet can discharge the gas from the chamber after separation of the gas from the solvent. The gas liquid separators can include a mechanism, e.g., a phase-change inducing mechanism, a regulator, and the like, disposed in or proximate to the fluid mixture inlet to create a phase change of a substantial part of the fluid mixture at or within the fluid mixture inlet. In some embodiments, the substantial part of the fluid mixture can be, e.g., more than about 65%, more than about 70%, more than about 75%, more than about 80%, more than about 85%, more that about 90%, more than about 95%, and the like.

Figure 3:
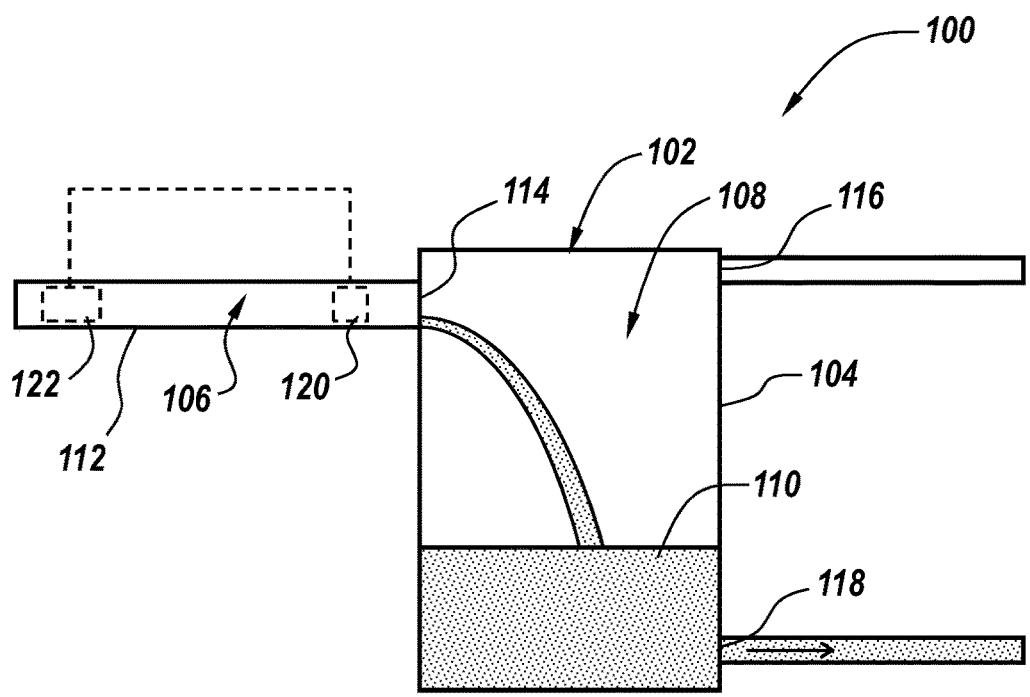
FIG. 3 shows a diagrammatic, side view of an exemplary flow system including a gas liquid separator.

FIG. 3 shows a diagrammatic, side view of an exemplary flow system 100, e.g., a SFC and/or $CO_2$-based chromatography system. The flow system 100 includes a gas liquid separator 102. The gas liquid separator 102 includes a chamber 104 for receiving a fluid mixture 106. The fluid mixture 106 includes combinations of fluids. For example, the fluid mixture 106 can include $CO_2$, a solvent, a modifier, and a sample. In particular, the fluid mixture 106 can be introduced into the chamber 104 to separate the fluid mixture 106 into a gas 108 and a solvent 110.

The fluid mixture 106 can be introduced into the chamber 104 through piping 112 leading to a fluid mixture inlet 114. As will be discussed in greater detail below, in some embodiments, the gas liquid separator 102 can include an impinging separator element or a cyclone separator element downstream of the inlet 114 to separate the fluid mixture 106 into the gas 108 and solvent 110. Upon separation into the gas 108 and solvent 110, the gas 108 can be discharged from the chamber 104 through a gas outlet 116, e.g., a $CO_2$ outlet, and the solvent 110 can be discharged from the chamber 104 through a solvent outlet 118, e.g., a solvent/sample outlet. In one embodiment, tubing forming the inlet and outlet will have an inner diameter in the range of about 0.002 to 0.05 inches.

The energy of the fluid mixture 106 entering the chamber 104 of the gas liquid separator 102 affects the efficiency of the mechanical agitation or centrifugal force which allows separation of the fluid mixture 106 into the gas 108 and solvent 110. In particular, as the energy of the fluid mixture 106 entering the chamber 104 increases, the mechanical agitation or centrifugal force increases to improve the efficiency of separation. The gas liquid separator 102 includes a mechanism 120, e.g., a phase-change inducing mechanism, a regulator, a back pressure regulator, and the like, disposed or integrated in or proximate to the inlet 114. In some embodiments, the mechanism 120 can be disposed immediately upstream of the inlet 114. The mechanism 120 can create a phase change of a substantial part of the fluid mixture 106 at or within the inlet 114 by regulating the pressure at the inlet 114. For example, in some embodiments, the mechanism 120 can create a phase change of, e.g., the entire fluid mixture 106, the majority of the fluid mixture 106, and the like. Thus, the mechanism 120 can provide an integrated pressure regulation at the inlet 114 of the gas liquid separator 102. In particular, as the fluid mixture 106 flows through the mechanism 120, a substantial part of the fluid mixture 106 can undergo a phase change due to expansion from liquid to gas. This expansion can be regulated by controlling and/or adjusting the size of the opening at the inlet 114, thereby varying the pressure at the fluid mixture 106.

The phase change of the fluid mixture 106 can provide energy to the fluid mixture 106 prior to introduction of the fluid mixture 106 into the chamber 104. Specifically, the phase change of the fluid mixture 106 increases the kinetic energy or velocity of the fluid mixture 106 to either increase the impact force of the fluid mixture against an impinging separator element or increase the centrifugal vortex of the fluid mixture 106 within a cyclone separator element within the chamber 104. The increased velocity of the fluid mixture 106 ensures a substantially complete separation (e.g., about 95%, about 97%, about 99%, and the like) of the fluid mixture 106 when the fluid mixture 106 is discharged from the inlet 114.

In some embodiments, the mechanism 120 can be, e.g., an actively controlled pressure regulator, a passively controlled pressure regulator, and the like. An actively controlled pressure regulator can be associated with a sensor 122. For example, the sensor 122 can be wired and/or wirelessly connected to the mechanism 120 (as indicated by the dashed line). The sensor 122 can detect characteristics of the fluid mixture 106, e.g., the velocity, the pressure, composition, temperature, and the like, upstream of the mechanism 120 and can automatically provide feedback to the mechanism 120 such that the mechanism 120 can regulate the pressure of the fluid mixture 106 at the inlet 114. In some embodiments, the sensor 122 can provide feedback regarding the characteristics of the fluid mixture 106 to a graphical user interface such that a user can regulate mechanism 120 to control the pressure of the fluid mixture 106 at the inlet 114. For example, based on the feedback from the sensor 122 (e.g., a PID sensor), the passage through inlet 114 can be regulated by the mechanism 120 to increase or decrease the pressure at the inlet 114. This feedback can occur continuously throughout the entirety of the chromatographic run.

In embodiments including a passively controlled pressure regulator, the mechanism 120 can include a spring load or a similar mechanism therein. For example, the spring load can be adjustably set by a user such that the mechanism 120 regulates the pressure of the fluid mixture 106 at the inlet 114. In particular, the spring load can be calibrated to provide a specific pressure of the fluid mixture 106 at the inlet 114. It should be understood that the spring load can be varied by a user to vary the pressure of the fluid mixture 106 at the inlet 114.

The phase control can be directly related to pressure control. In particular, pressure control can maintain the necessary pressure drop to result in the liquid phase upstream and the gas phase downstream of the mechanism 120. In some embodiments, a two stage actively controlled pressure regulator can include a fine control (e.g., liquid in, liquid out) and a coarse control (e.g., liquid in, gas out). In some embodiments, the coarse control can be replaced by a passively controlled pressure regulator, thereby resulting in a two stage active/passive system. In some embodiments, a two stage passively controlled pressure regulator can be used if, e.g., a one stage passively controlled pressure regulator is being heavily worn by the expansion process, other undesirable physical effects are occurring, or the like.

In some embodiments, the mechanism 120 can be a one stage regulator or a two stage regulator. For example, the one stage regulator can be set or calibrated for a predetermined pressure of the fluid mixture 106 at the inlet 114 which regulates both the pressure and the phase change of the fluid mixture 106. As a further example, the two stage regulator can include a first stage for regulating a pressure of the fluid mixture 106 at or within the mechanism 120 and/or the inlet 114, and a separate and distinct second stage for regulating the phase change of the substantial part of the fluid mixture 106.

In some embodiments, the one stage regulator can include a single control valve for performing the fine control and the phase change in one regulator. Due to the complex nature of regulating the nonlinear effects of phase change, in some embodiments, the two stage regulator can include two control valves, e.g., a coarse control valve and a fine control valve. For example, the coarse control valve can handle the pressure drop associated with the phase change and the fine control valve can function with a more linear and stable system.

In some embodiments, the mechanism 120, e.g., regulator, can be a needle or poppet and seat-based regulator. For example, a needle or poppet can mechanically interact with a complementary seat such that the passage of the fluid mixture 106 through the mechanism 120 can be regulated. Constriction of the passage with the needle or poppet relative to the seat can thereby increase the pressure within the mechanism 120 and create a phase change of the fluid mixture 106. In some embodiments, the mechanism 120 can be diaphragm-based. For example, rather than a needle or poppet, a diaphragm can be used to regulate the passage of the fluid mixture 106 through the mechanism 120 to create the phase change.

Figure 4:
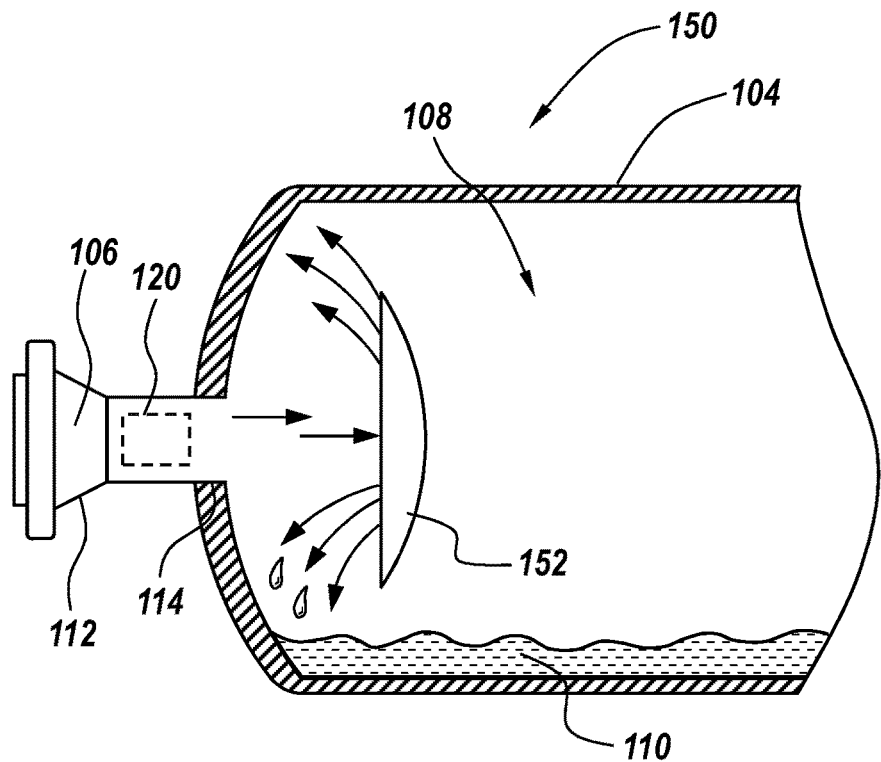
FIG. 4 shows a diagrammatic, side cross-sectional view of an exemplary gas liquid separator including an impinging separator element.

FIG. 4 shows a diagrammatic, cross-sectional side view of an exemplary gas liquid separator 150, e.g., an impinging gas liquid separator. The gas liquid separator 150 can be substantially similar in structure and function to the gas liquid separator 102 discussed above, except for the distinctions noted herein. Therefore, like components are marked with like reference numbers.

In particular, the gas liquid separator 150 includes an impinging separator element 152 against which the fluid mixture 106 can be discharged from the inlet 114. The mechanism 120 ensures a sufficiently high kinetic energy or velocity of the fluid mixture 106 upon discharge from the inlet 114. The fluid mixture 106 can thereby be discharged against a surface of the impinging separator element 152 defining a geometry which redirects the flow of the fluid mixture 106 at the impact surface to separate the gas 108 from the solvent 110. For example, the impinging separator element 152 can define a substantially flat impact surface and a curved opposing surface.

Figure 5:
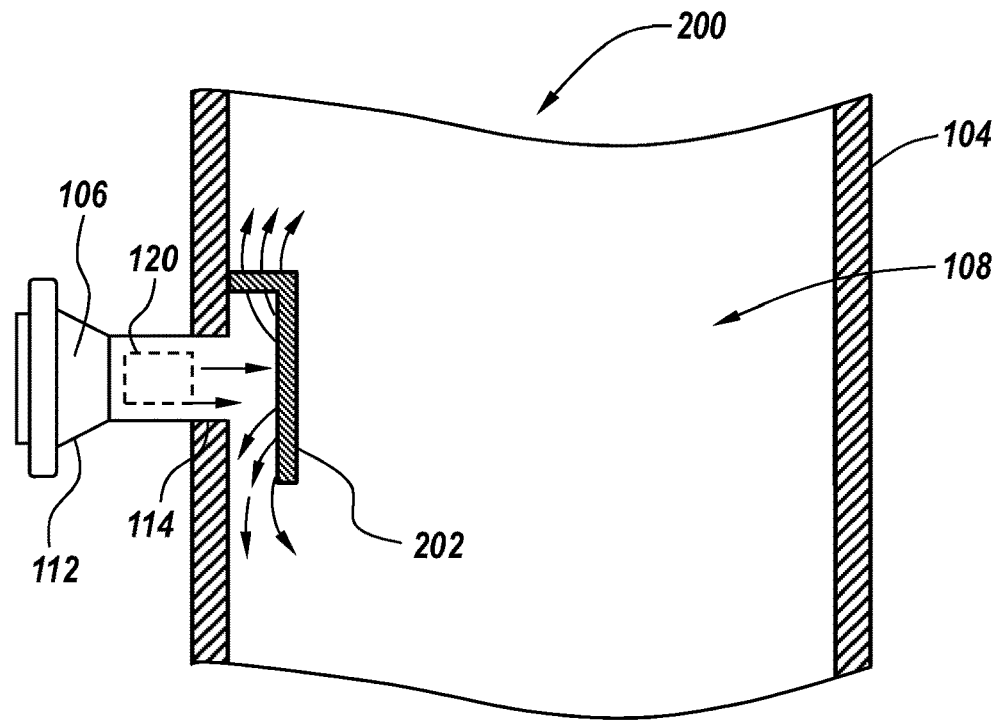
FIG. 5 shows a diagrammatic, side cross-sectional view of another exemplary gas liquid separator including an impinging separator element.

FIG. 5 shows a diagrammatic, cross-sectional side view of an exemplary gas liquid separator 200, e.g., an impinging gas liquid separator. The gas liquid separator 200 can be substantially similar in structure and function to the gas liquid separators 102, 150 discussed above, except for the distinctions noted herein. Therefore, like components are marked with like reference numbers.

In particular, the gas liquid separator 200 includes an impinging separator element 202 defining a different impact surface geometry than the impinging separator element 152 of the gas liquid separator 150. For example, the impinging separator element 202 can define a substantially flat impact surface and opposing surface. As described above, the fluid mixture 106 having a high kinetic energy or velocity can be discharged from the inlet 114 and against the impact surface of the impinging separator element 202 such that the fluid mixture 106 separates into the gas 108 and liquid 110.

Figure 6:
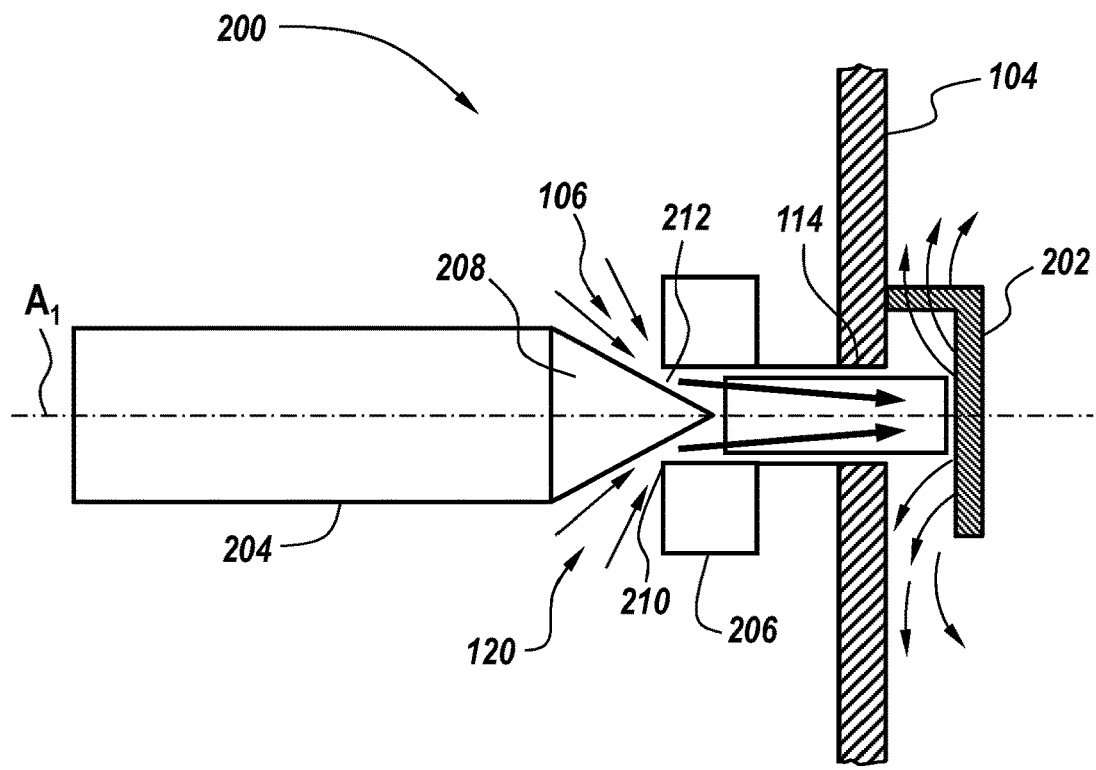
FIG. 6 shows a diagrammatic, side cross-sectional view of yet another exemplary gas liquid separator including an impinging separator element.

FIG. 6 shows a detailed diagrammatic, cross-sectional side view of the gas liquid separator 200. In particular, FIG. 6 shows a detailed view of the mechanism 120. The mechanism 120 can include a needle 204 which mechanically interacts with a seat 206. For example, the needle 204 can travel along the longitudinal axis $A_1$ away from and in the direction of the seat 206 to vary the flow path 212. In general, the angle of the sealing surface between the needle and the seat is important as it can determine the effectiveness of the stroke, whether or not the needle sticks, and how well the needle self-centers in the seat. In certain embodiments, the needle 204 is positioned at about a 30 degree angle. In other embodiments, it is positioned at an angle of 25 to 40 degrees. While not wishing to be bound by theory, it is believed that an angle of 60 to about 90 degrees would interfere with the needles ability to self-center as well as close the aperture of the seat. Although illustrated as including a needle 204, in some embodiments, the mechanism 120 can include a poppet or a diaphragm which interacts with a complementary seat 206. The mechanism 120 can regulate the pressure at the inlet 114 by varying the position or separation between the sealing surface 208 of the needle 204 and the sealing surface 210 of the seat 206. By varying the separation between these surfaces 208, 210, the flow path 212 of the fluid mixture 106 can be restricted or expanded to vary the pressure at the inlet 114. For example, an increased pressure at the inlet 114 due to a restriction of the flow path 212 can create a phase change of the fluid mixture 106 at the nozzle or inlet 114 to the gas liquid separator 200. Expansion of a substantial part of the fluid mixture 106 from liquid to gas can provide a significant amount of energy for impact force against the impinging separator element 202.

Figure 7:
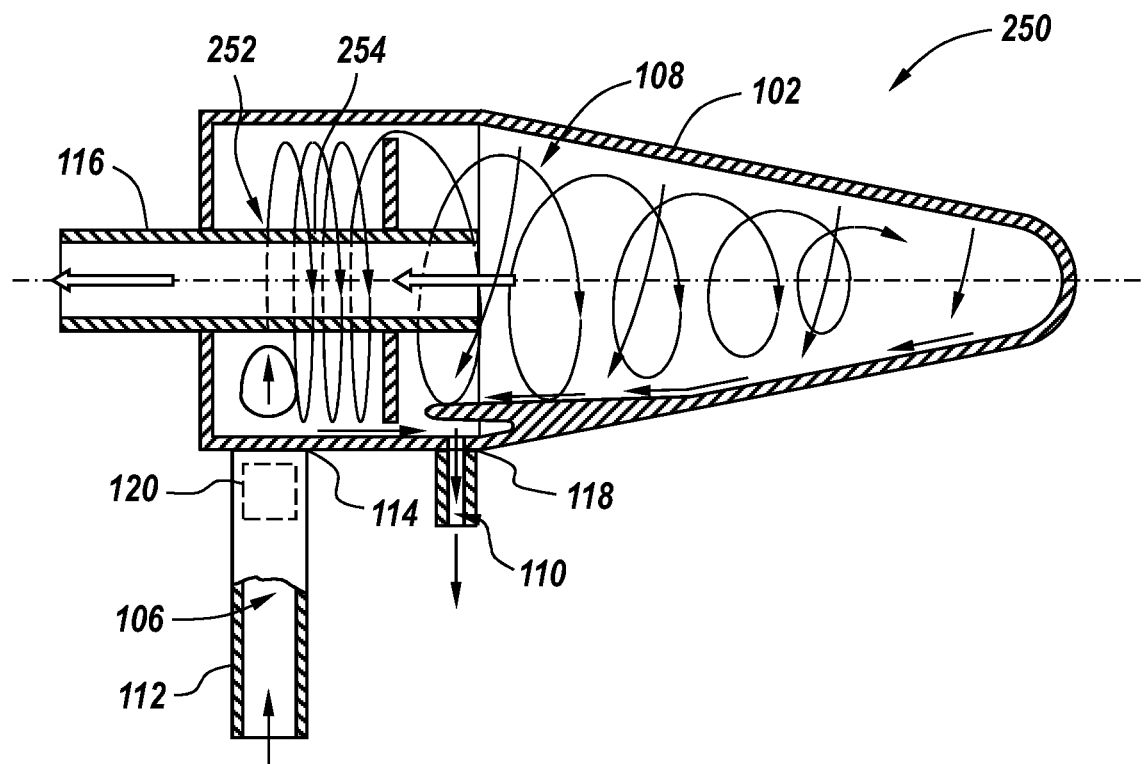
FIG. 7 shows a diagrammatic, side cross-sectional view of an exemplary gas liquid separator including a cyclone separator element.

Similarly, the increased energy of the fluid mixture 106 can increase the centrifugal vortex in a cyclone gas liquid separator. FIG. 7 shows a diagrammatic, cross-sectional side view of an exemplary gas liquid separator 250, e.g., a cyclone gas liquid separator. The gas liquid separator 250 can be substantially similar in structure and function to the gas liquid separators 102, 150, 200 discussed above, except for the distinctions noted herein. Therefore, like components are marked with like reference numbers.

In particular, the gas liquid separator 250 includes a centrifugal vortex 252 which is created within the chamber 102 due to the cyclonic separation element 254 upon discharge of the fluid mixture 106 from the inlet 114. The mechanism 120 disposed within, proximate to, or directly upstream of the inlet 114 can be used to regulate the flow path of the fluid mixture 106 through the inlet 114, thereby regulating the pressure and phase change at the inlet 114. In some embodiments, it is preferable to integrate the mechanism 120 within the inlet to the GLS. Creating a phase change, e.g., expansion from liquid to gas, at the inlet 114 can provide a significant amount of energy into the flow of the fluid mixture 106 to increase the centrifugal vortex 252. The increased centrifugal vortex 252 results in an improved separation of the fluid mixture 106 into the gas 108 and solvent 110.

Figure 2:
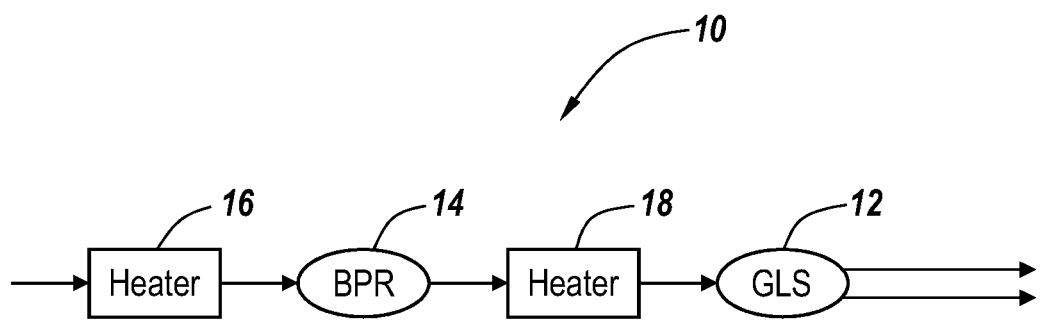
FIG. 2 shows a diagrammatic view of a flow system of the prior art.
Figure 8:
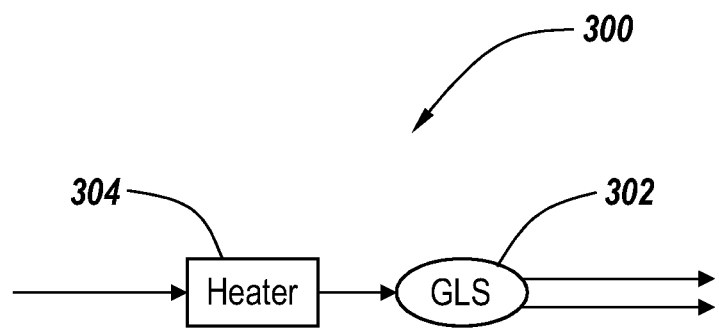
FIG. 8 shows a diagrammatic view of an exemplary flow system including a gas liquid separator.

FIG. 8 shows a diagrammatic view of an exemplary flow system 300, e.g., a SFC or $CO_2$-based chromatography system, that includes a gas liquid separator 302. It should be understood that the gas liquid separator 302 can be any of the exemplary gas liquid separators discussed herein. Due to the incorporation of the mechanism, e.g., a phase-change inducing mechanism, a regulator, a back pressure regulator, and the like, at the inlet of the gas liquid separator 302, and, in contrast to the flow system 10 of FIG. 2, the flow system 300 does not require a back pressure regulator and two heaters upstream of the gas liquid separator 302. The fluid mixture can thereby be maintained in a liquid state upstream of the gas liquid separator 302 and the phase change can occur at the inlet of the gas liquid separator 302.

In some embodiments, the flow system 300 can function without a heater 304. In some embodiments, a single heater 304 can be disposed upstream of the gas liquid separator 302 to heat the fluid mixture prior to entering the gas liquid separator 302, thereby providing additional energy to the fluid mixture without requiring two heaters. The heater 304 can further regulate the temperature of the fluid mixture entering the gas liquid separator 302 which, in turn, affects the phase separation. For example, the heater 304 can regulate the temperature of the fluid mixture to improve the separation of the fluid mixture into the gas and solvent. The heater 304 can thereby function as the gas liquid separator 302 temperature controller and a second heater is not necessary. The lack in necessity of a back pressure regulator and a second heater eliminates tubing or piping typically used between the heaters, back pressure regulator and the gas liquid separator 302. Therefore, loss of a portion of the sample within the piping is reduced or eliminated.

In some embodiments, the fluid mixture can be maintained in the liquid state as long as possible, e.g., up to the phase-change inducing mechanism in the gas liquid separator inlet. Maintaining the fluid mixture in the liquid state ensures that the sample can stay in a solution for a longer period of time since compounds have lower solubility in the gas state. In some embodiments, the pressure of the fluid mixture can be maintained in a high pressure gas state in the system. However, this may increase costs of the flow system. In some embodiments, a back pressure regulator can be disposed immediately upstream of the gas liquid separator inlet and a short tube or pipe can connect the back pressure regulator to the gas liquid separator. The short tube or pipe can limit the time the fluid mixture is in the aerosol condition. The back pressure regulator can thereby function substantially similar to the phase-change inducing mechanism described herein. Although specific regulator types are discussed herein, it should be understood that a variety of alternative pressure regulators can be used that allow aiming of the discharge of the fluid mixture into the gas liquid separator.

The exemplary gas liquid separators discussed herein advantageously increase the energy of the fluid mixture prior to discharge into the chamber of the gas liquid separator. As a result, the sample is not left behind in upstream piping of the flow system. In addition, by increasing the energy of the fluid mixture at or within the fluid mixture inlet prior to discharge into the chamber of the gas liquid separator, sufficient energy is provided to the flow of the fluid mixture for the desired separation of the fluid mixture into the solvent and gas to occur within the gas liquid separator. Further still, by increasing the energy of the fluid mixture at or within the fluid mixture inlet, the amount of piping, components, or both, in a flow system can be reduced while maintaining sufficient flow of the fluid mixture for separation. The gas liquid separators can therefore operate efficiently over a wide range of flows.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A gas liquid separator, comprising:
a chamber for receiving a fluid mixture inlet, the fluid mixture inlet providing an inlet for a fluid mixture into the chamber,
a liquid solvent outlet,
a gas outlet, and
an actively controlled pressure regulator disposed within the fluid mixture inlet, wherein the actively controlled pressure regulator further comprises a sensor and is configured to create a phase change of a substantial part of the fluid mixture within the fluid mixture inlet in response to feedback from the sensor.

2. The gas liquid separator of claim 1, wherein creating the phase change of the substantial part of the fluid mixture within the fluid mixture inlet provides energy to the fluid mixture prior to introduction of the fluid mixture into the chamber to improve separation of the fluid mixture into the solvent and the gas.

3. The gas liquid separator of claim 2, wherein providing energy to the fluid mixture increases kinetic energy or velocity of the fluid mixture to provide an increased impact force of the fluid mixture against an impinging separator element within the chamber.

4. The gas liquid separator of claim 2, wherein providing energy to the fluid mixture increases kinetic energy or velocity of the fluid mixture to provide an increased centrifugal vortex of the fluid mixture within a cyclone separator element within the chamber.

5. The gas liquid separator of claim 1, wherein the actively controlled pressure regulator maintains the fluid mixture in a liquid state prior to the phase change within the fluid mixture inlet.

6. The gas liquid separator of claim 1, wherein the sensor is disposed upstream of the actively controlled pressure regulator.

7. The gas liquid separator of claim 1, wherein the actively controlled pressure regulator is a one stage regulator or a two stage regulator.

8. The gas liquid separator of claim 7, wherein the one stage regulator is set for a predetermined pressure of the fluid mixture at the fluid mixture inlet.

9. The gas liquid separator of claim 7, wherein the two stage regulator comprises a first stage for regulating a pressure of the fluid mixture at or within the fluid mixture inlet and a second stage for regulating the phase change of the substantial part of the fluid mixture.

10. The gas liquid separator of claim 1, wherein the phase change of the substantial part of the fluid mixture occurs at or within a nozzle of the fluid mixture inlet.

11. The gas liquid separator of claim 1, wherein the fluid mixture comprises $CO_2$ and the solvent.

* * * * *